United States Patent [19]
Hall

[11] 3,709,301
[45] Jan. 9, 1973

[54] ADJUSTABLE TOE WEIGHT FOR HORSES

[76] Inventor: Richard L. Hall, 2888 E. Pleasant Avenue, Eden, N.Y. 14057

[22] Filed: Feb. 11, 1971

[21] Appl. No.: 114,650

[52] U.S. Cl. ............................................. 168/25
[51] Int. Cl. ........................................... A01l 07/00
[58] Field of Search .......................... 168/25; 54/82

[56] References Cited

UNITED STATES PATENTS 230,385  7/1880  Woodruff ........................ 168/25
484,022  10/1892  Jerome ........................... 168/25
479,831  8/1892  McMillan ......................... 168/25

Primary Examiner—Hugh R. Chamblee
Attorney—Robert E. Walter

[57] ABSTRACT

In an adjustable toe weight for a horse's hoof, a band which extends laterally across the hoof is attached thereto at each end and a weight having a guide slot for receiving the band is provided with means for fastening the weight to the band to permit positioning the weight across the hoof.

7 Claims, 6 Drawing Figures

PATENTED JAN 9 1973  3,709,301

INVENTOR.
RICHARD L. HALL
BY Robert E. Walter

ADJUSTABLE TOE WEIGHT FOR HORSES

BACKGROUND OF THE INVENTION

Toe weights are commonly used in the form of a base or backing member of rectangular shape connected by screws to the horse's hoof. The base can either have a tongue projecting upwardly or a threaded opening. In either case a weight is secured to the base by the weight fitting over the tongue member, or in the second case, a weight secured by a screw engaging the threaded opening.

Use of such toe weights have many disadvantages. For example, to position the toe weight in a new position on the hoof requires a time consuming process of removing the weight, unscrewing the backing member, rescrewing the backing member in a new location, and then installing the weight. Furthermore, the horses hoof may become damaged by repeatedly adjusting the position of the weight.

In training horses to maintain the desired gate, not only the weight of the toe assembly is important, but also its position on the hoof. The position on the hoof effects the direction of flight of the hoof. By moving the weight laterally across the hoof the horse will tend to throw its hoof in the direction that the weight is moved.

Heretofore, toe weights have been moved to new positions on a hoof with great difficulty and inconvenience.

SUMMARY OF THE INVENTION

It is an object of the present invention to provide an improved toe weight assembly which is easily moved to different positions on a hoof.

Another object of the present invention is to provide an improved toe weight assembly characterized by the simplicity of its parts and ease of manufacture.

Other and further objects of the present invention will become apparent upon reading the following description of the present invention.

In accordance with the present invention, there is provided an adjustable toe weight assembly for a hoof comprising a band adapted for extending laterally across the hoof, means for securely attaching end portions of said band to the hoof, a weight member having a guide slot therein for receiving said band, and means for securing said weight member to said band to permit positioning the weight member across the hoof.

BRIEF DESCRIPTION OF THE DRAWINGS

The drawings which illustrate the preferred embodiment of the present invention are as follows.

DETAILED DESCRIPTION OF THE PREFERRED EMBODIMENT

Figure 1:
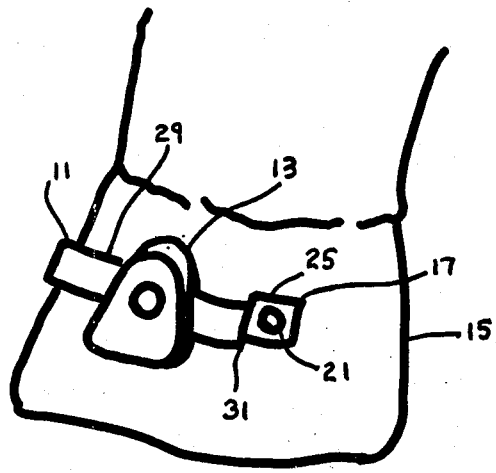
FIG. 1 is a perspective view of the weight assembly as mounted on a horse's hoof.
Figure 3:
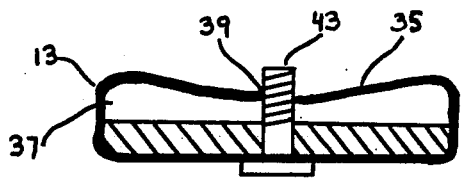
FIG. 3 is a top view of the weight member along section 3—3 of FIG. 2.
Figure 4:
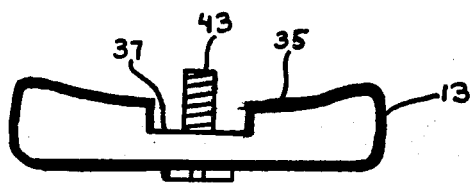
FIG. 4 is a side view of the weight member.
Figure 5:
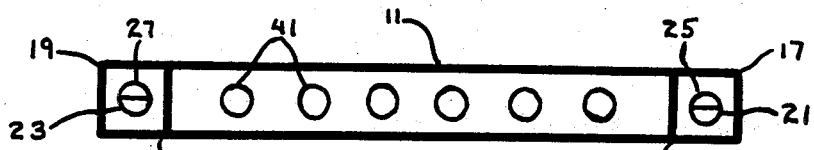
FIG. 5 is a front elevational view of the band.
Figure 6:
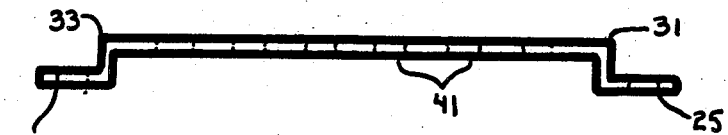
FIG. 6 is a side view of the band of the present invention.

The preferred form of the weight assembly of the present invention comprises two principle components in the form of a band generally indicated at 11 and a weight member generally indicated at 13. As show in FIG. 1, the band is adapted to be detachably secured to a horse's hoof 15 and the weight member 13 is firmly but removably connected to the band 11.

More particularly the band 11 is of steel or metal construction. It is preferably about one-half inch in width. The end portions 17 and 19 are flat and have openings 21 and 23 therein. The openings 21 and 23 receive threaded screws 25 and 27 which secure the band to the hoof 15 by engaging the hoof 15. A raised center portion 29 forms a bridge between a pair of shoulders 31 and 33. Each shoulder 31 and 33 is positioned inwardly about three-quarters of an inch from the respective ends of the band 11 and projects outwardly from the hoof about one-quarter of an inch.

Figure 2:
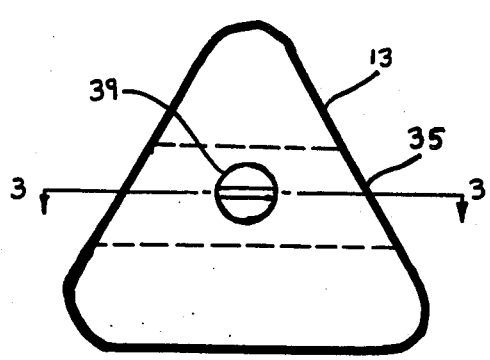
FIG. 2 is a front view of the weight assembly.

Although weight members of varying shapes may be employed in the present invention, the weight member 13, as illustrated in FIG. 2, is of generally triangular shape having rounded edges. The rear face 35 of the weight member 13 has a generally concave curvature between the lateral edges thereof and a concave curvature from top to bottom so as to conform to the curvature of the horse's hoof 15. The thickness and general size of the weight member 13 is determined by the amount of weight desired.

A recess or guide slot 37 extends laterally across the rear face 35 of the weight member 13. The recess is intermediate the top and bottom of the weight member 13. The width of the guide slot 37 matches the width of the band 11 so that the band 11 fits snugly therein. The guide slot 37 is of sufficient depth so that the contoured surfaces of the rear face 35 contact the hoof 15. Preferably the depth thereof is about one-quarter of an inch.

The weight member 13 has a straight bore 39 extending therethrough and opening into the guide slot 37. The band 11 includes a plurality of laterally spaced openings 41 for receipt of a threaded bolt or screw 43. Bolt 43 secures the weight member 13 to the band 11 by passing through the weight member 13 and engaging the band 11. As shown in FIG. 2, the bore 39 is preferably located in the lengthwise center of the guide slot 37. It is contemplated that for larger weights, for example on the order of four or more ounces, a plurality of bores may be positioned within the guide slot 37 and a plurality of screws be used to secure the weight member 13 to the band 11.

While the present invention has been described in detail, it will be apparent to persons skilled in the art that various changes, variations and modifications may be made without departing from the spirit and scope of the present invention. It is contemplated that the appended claims cover all such changes, variations and modifications.

What is claimed is:

1. An adjustable toe weight assembly for a hoof comprising a band adapted for extending laterally across the hoof, means for securely attaching the end portions of said band to the hoof, a weight member having a guide slot therein for receiving said band, and means for firmly securing said weight member to said band at different positions on said band to permit positioning the weight member across the hoof.

2. An adjustable toe weight assembly according to claim 1 wherein the end portions of said band have openings therein and said means for attaching the band includes screws passing through the openings and engaging the hoof.

3. An adjustable toe weight assembly according to claim 1 wherein said guide slot extends laterally across the weight member intermediate the top and bottom thereof.

4. An adjustable toe weight assembly according to claim 3 wherein the rear face of said weight member is contoured so as to conform to the curvature of the hoof.

5. An adjustable toe weight assembly according to claim 4 wherein said band includes a center portion projecting outwardly from the hoof.

6. An adjustable toe weight assembly according to claim 5 wherein said guide slot is recessed to a depth so the rear face contacts the hoof.

7. An adjustable toe weight assembly according to claim 6 wherein said weight member has a straight bore extending therethrough opening into said guide slot, said band includes a plurality of laterally spaced openings therein, and said securing means includes a bolt passing through said bore and engaging said band at the lateral openings.

* * * * *